US009604397B2

(12) United States Patent
Blais et al.

(10) Patent No.: US 9,604,397 B2
(45) Date of Patent: Mar. 28, 2017

(54) MELT DISTRIBUTION DEVICE

(71) Applicant: Husky Injection Molding Systems Ltd., Bolton (CA)

(72) Inventors: Paul R. Blais, South Burlington, VT (US); James Osborne Plumpton, Enosburg Falls, VT (US); Brian Esser, Colchester, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/416,284

(22) PCT Filed: Sep. 10, 2013

(86) PCT No.: PCT/US2013/058943
§ 371 (c)(1),
(2) Date: Jan. 22, 2015

(87) PCT Pub. No.: WO2014/043088
PCT Pub. Date: Mar. 20, 2014

(65) Prior Publication Data
US 2015/0202813 A1    Jul. 23, 2015

Related U.S. Application Data

(60) Provisional application No. 61/700,388, filed on Sep. 13, 2012.

(51) Int. Cl.
B29C 45/20    (2006.01)
B29C 45/74    (2006.01)
H05B 3/26    (2006.01)

(52) U.S. Cl.
CPC ............. B29C 45/74 (2013.01); H05B 3/265 (2013.01); *H05B 2203/013* (2013.01)

(58) Field of Classification Search
CPC ........................... B29C 45/27; B29C 45/2725
USPC .................................................. 425/549, 572
See application file for complete search history.

(56) References Cited

U.S. PATENT DOCUMENTS

| 5,360,333 | A | 11/1994 | Schmidt |
| 5,973,296 | A | 10/1999 | Juliano et al. |
| 6,035,101 | A | 3/2000 | Sajoto et al. |
| 6,043,466 | A | 3/2000 | Jenko et al. |
| 6,305,923 | B1 | 10/2001 | Godwin et al. |
| 6,717,118 | B2 | 4/2004 | Pilavdzic et al. |
| 6,854,971 | B2 | 2/2005 | Pilavdzic et al. |
| 7,241,131 | B1 | 7/2007 | Booth et al. |
| 7,377,768 | B2 | 5/2008 | Gellert et al. |
| 2002/0054932 | A1* | 5/2002 | Gellert ................. B23P 15/007 425/549 |

(Continued)

OTHER PUBLICATIONS

Fred H. Colvin and Frank A. Stanley, American Machinists' Handbook, Jan. 1940, 7th Edition, pp. 212-227.*
International Search Report, 3 pages.

*Primary Examiner* — Tim Heitbrink

(57) ABSTRACT

A melt distribution device (100) including a heat-receiving part (102) and a heater (104). The heater (104) is coupled to the heat-receiving part (102) so to maintain thermal communication between the heater (104) and the heat-receiving part (102). The heater (104) is also coupled to the heat-receiving part (102) so to isolate, at least partially, the heater (104) from receiving stress and strain transmission from the heat-receiving part (102).

14 Claims, 3 Drawing Sheets

(56) References Cited

U.S. PATENT DOCUMENTS

| | | |
|---|---|---|
| 2007/0086759 A1 | 4/2007 | Russegger et al. |
| 2008/0138053 A1 | 6/2008 | Russegger et al. |
| 2010/0272851 A1* | 10/2010 | Gunther .................. B29C 45/27 425/570 |
| 2011/0117238 A1* | 5/2011 | Gunther ................ B29C 45/278 425/569 |
| 2013/0287884 A1* | 10/2013 | Jenko .................. B29C 45/2737 425/549 |

* cited by examiner

MELT DISTRIBUTION DEVICE

TECHNICAL FIELD

Non-Limiting embodiments disclosed herein generally relate to a melt distribution device comprising a heat-receiving part and a heater.

BACKGROUND

Molding is a process by virtue of which a molded article can be formed from molding material by using a molding system. Various molded articles can be formed by using the molding process, such as an injection molding process. An example of a molded article that can be formed, for example, from polyethylene terephthalate (PET material) is a preform suitable for subsequent blow molding into a final shaped container.

A typical injection molding machine includes a material hopper, an injection unit (e.g. a screw-type plunger), and a heating unit. With injection molding, granular plastic is typically fed by gravity from a hopper into a heated barrel. As the granules are moved forward by a screw, the plastic is forced into a heated chamber, where it is melted. As the screw advances, the melted plastic is forced through a nozzle that rests against the mold, allowing it to enter the mold cavity through a gate and melt distribution system, e.g. hot runner system. Hot runner systems are used in molding systems, along with mold assemblies, for the manufacture of plastic articles. Usually, hot runner systems and mold assemblies are treated as tools that may be sold separately (or together) from molding systems.

A hot runner system is typically comprised of several components: a sprue to receive molten resin from the injection nozzle, a manifold to distribute the resin to several ports, and a plurality of nozzles to transfer the resin from the manifold ports to the receiving molding cavities in the mold. Each of these components may have a different material composition, due to desired thermal, strength, or wear characteristics. Different material types result in differing rates of thermal expansion for the components. This may be understood as relative motion between the components during the heat up and cool down phases of operation. High thermal conductivity is often desirable for hot runner components.

SUMMARY

In accordance with an aspect disclosed herein, there is provided a melt distribution device. The melt distribution device comprises a heat-receiving part and a heater. The heater is coupled to the heat-receiving part, such that:
  (i) thermal communication is maintained between the heater and the heat-receiving part; and
  (ii) the heater is isolated, at least partially, from stress and strain that is transmitted from the heat-receiving part.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF NON-LIMITING EMBODIMENTS

Reference will now be made in detail to various non-limiting embodiment(s) of a melt distribution device for use in a molding system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
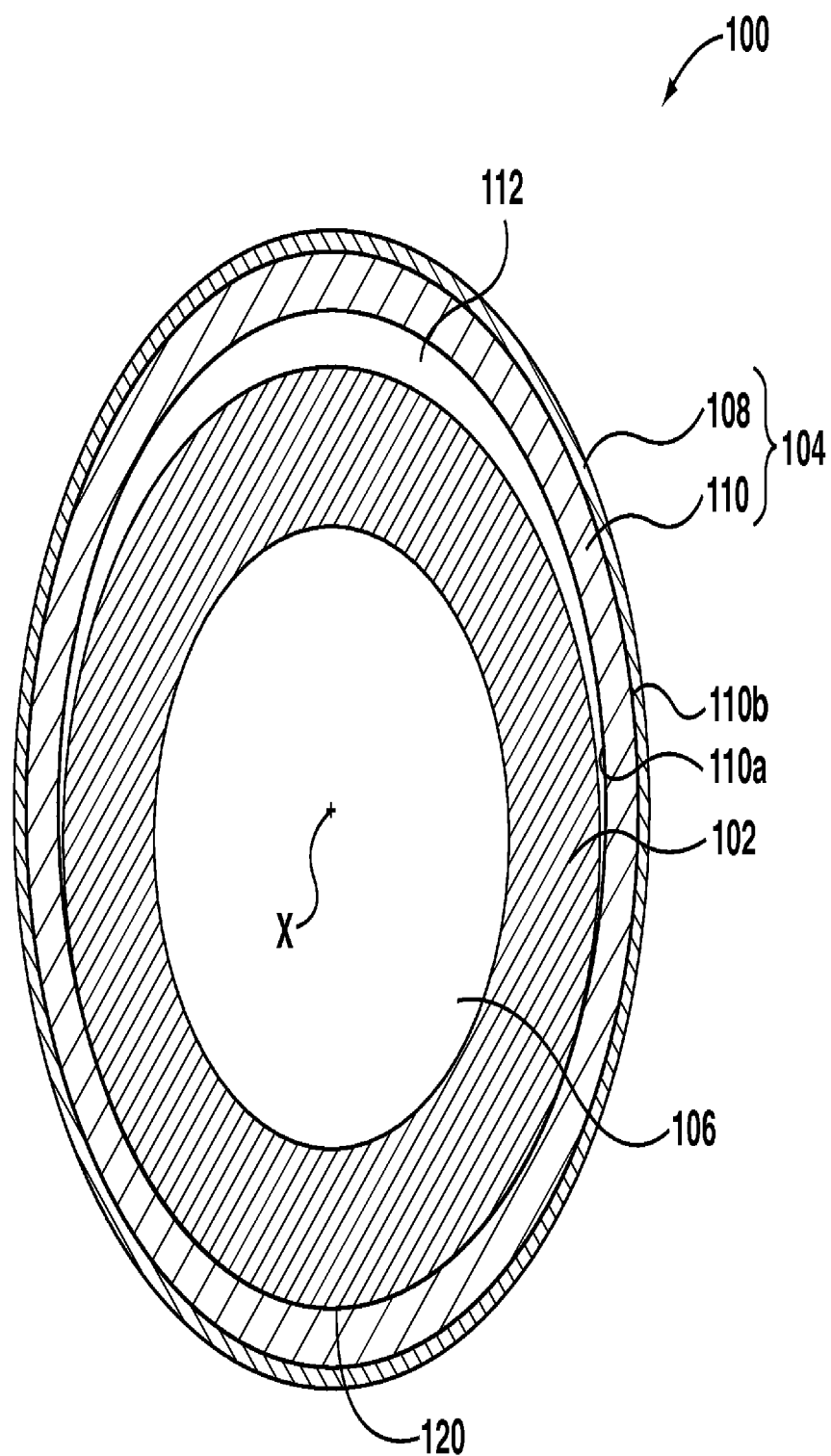
FIG. 1 depicts a cross-sectional view of a melt distribution device in accordance with a first non-limiting embodiment.

In accordance with a first non-limiting embodiment as depicted in FIG. 1, a melt distribution device 100 comprises a heat-receiving part 102. Examples of a heat-receiving part 102 may include (but are not limited to): a hot runner and components thereof, such as a nozzle and a manifold. The heat-receiving part 102, as depicted, defines a melt flow channel 106. The melt distribution device 100 also comprises a heater 104. The heater 104 is attached to the heat-receiving part 102, such that thermal communication is maintained between heat-receiving part 102 and the heater 104. The heater 104 is affixed to the heat-receiving part 102. Methods for affixing the heater 104 to the heat-receiving part 102 may be appropriately selected from methods well known in the art. Examples of methods for affixing the heater 104 to the heat-receiving part 102 include (but are not limited to) welding methods, such as laser welding methods and electron beam welding methods. The heater 104 is disposed around the heat-receiving part 102.

In the depicted non-limiting embodiments, the heater 104 may be a layered heater, or a film heater 108. The film heater 108 is disposed on a sleeve 110. The film heater 108 may, for example, be made from ceramic dielectric layers and resistive trace and may be appropriately selected from film heaters well known in the art, including (but not limited to): heaters applied by thermal spraying techniques (e.g. plasma spraying), thin film heaters, and thick film heaters, among others. The film heater 108 is deposited in a layer on a distal surface 110b of the sleeve 110. The distal surface 110b of the sleeve 110 being a surface that is opposite to a proximal surface 110a of the sleeve 110. The proximal surface 110a of the sleeve 110 is proximal relative to the heat-receiving part 102.

Both the heat-receiving part 102 and the heater 104 are substantially cylindrical in shape. The heater 104 is affixed to an outer surface (not separately numbered) of the heat-receiving part 102. More specifically, the proximal surface of the sleeve 110 may be welded in one location 120 to the outer surface of the heat-receiving part 102. The one location may be a line that extends along the outer surface of the heat-receiving part 102 and is substantially parallel to a longitudinal axis X thereof.

In the above configuration, it will be appreciated that a gap 112 is defined between the heater 104 and the heat-receiving part 102. The gap 112 may be filled with a medium. Examples of the medium include but are not limited to, for example, gases, including atmospheric air, liquids, or compressible solids, such as metallic foams.

In operation, the weld provides improved heat transfer capability by reducing inconsistency through lower thermal contact resistance. Furthermore, the heat-receiving part 102 can expand into the gap 112 thereby reducing, at least in part, the transmission of detrimental stress and strain from injection pressure and/or thermal expansion of the heat-receiving part 102 to the heater 104. It will be appreciated that for the depicted non-limiting embodiment, the volume of the gap 112 may be appropriately selected in order to accommodate expansion and deformation of the heat-receiving part 102 by selecting an appropriate diameter of the heater 104. Despite the gap 112, thermal communication is maintained between the heater 104 and the heat receiving part 102 through a combination of the point of attachment between the heater 104 and the heat receiving part 102 and through the gap 112.

Figure 2:
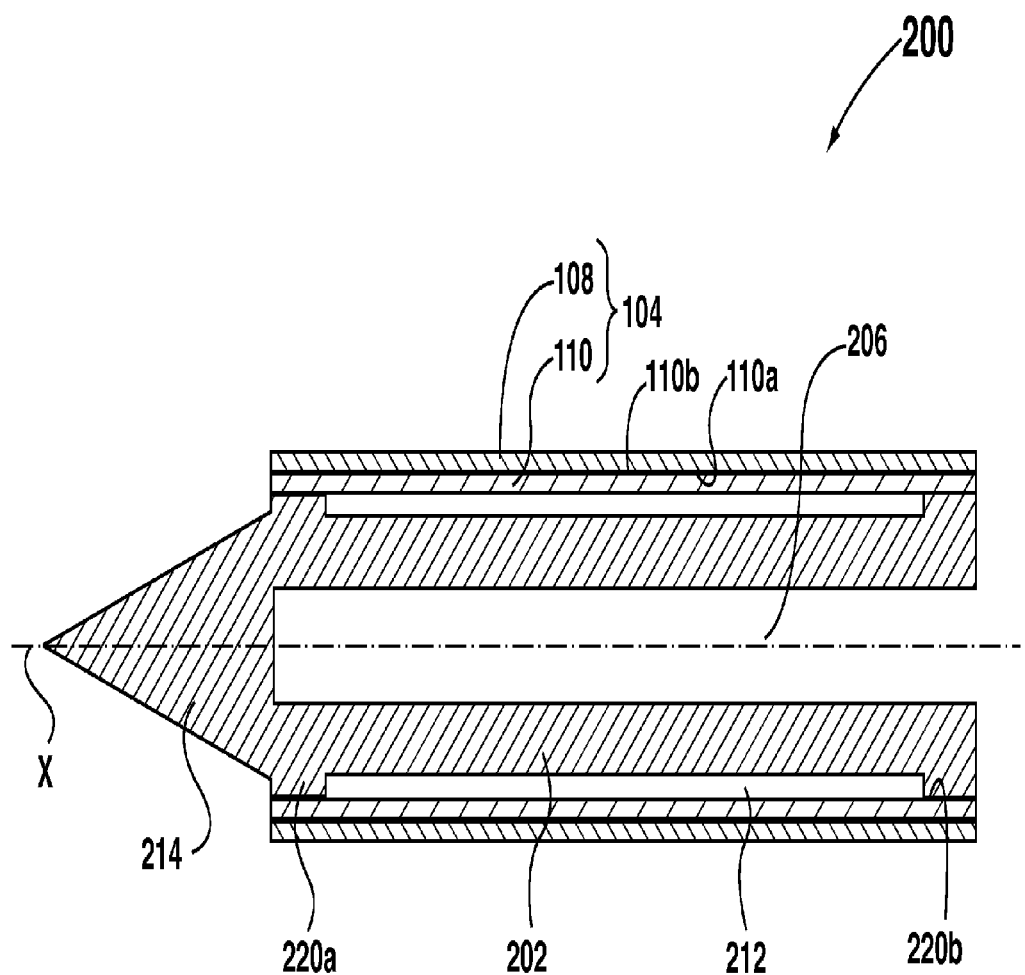
FIG. 2 depicts a cross-sectional view of a melt distribution device in accordance with a second non-limiting embodiment.

FIG. 2 depicts a second non-limiting embodiment of a melt distribution device 200, which is substantially similar to the first non-limiting embodiment depicted in FIG. 1, other than specific differences outlined below.

In the specific non-limiting embodiment depicted in FIG. 2, the heat-receiving part 202 is a nozzle, and both the heat-receiving part 202 and the heater 104 are substantially cylindrical in shape. The heater 104 is affixed to the outer surface of the heat-receiving part 202. More specifically, a portion of the proximal surface 110a of the sleeve 110 is welded in at least two distinct locations to the outer surface of the heat-receiving part 102. When the heat-receiving part 202 is a nozzle, a first welded location 220a is proximal to a nozzle tip 214, and a second welded location 220b is distal to the nozzle tip 214. Each of the at least two welded location 220a, 220b extends at least partially around the circumference of the outer surface of the nozzle. The outer surface of the heat-receiving part 202 and the proximal surface 110a of the sleeve 110 define at least one gap 212 extending around the circumference of the heat-receiving part 202 and located between the at least two welded locations 220a, 220b.

In operation, the heat-receiving part 202 can expand into the gap 212 thereby reducing, at least in part, the transmission of detrimental stress and strain from injection pressure and/or thermal expansion of the heat-receiving part 202 to the heater 204.

Figure 3:
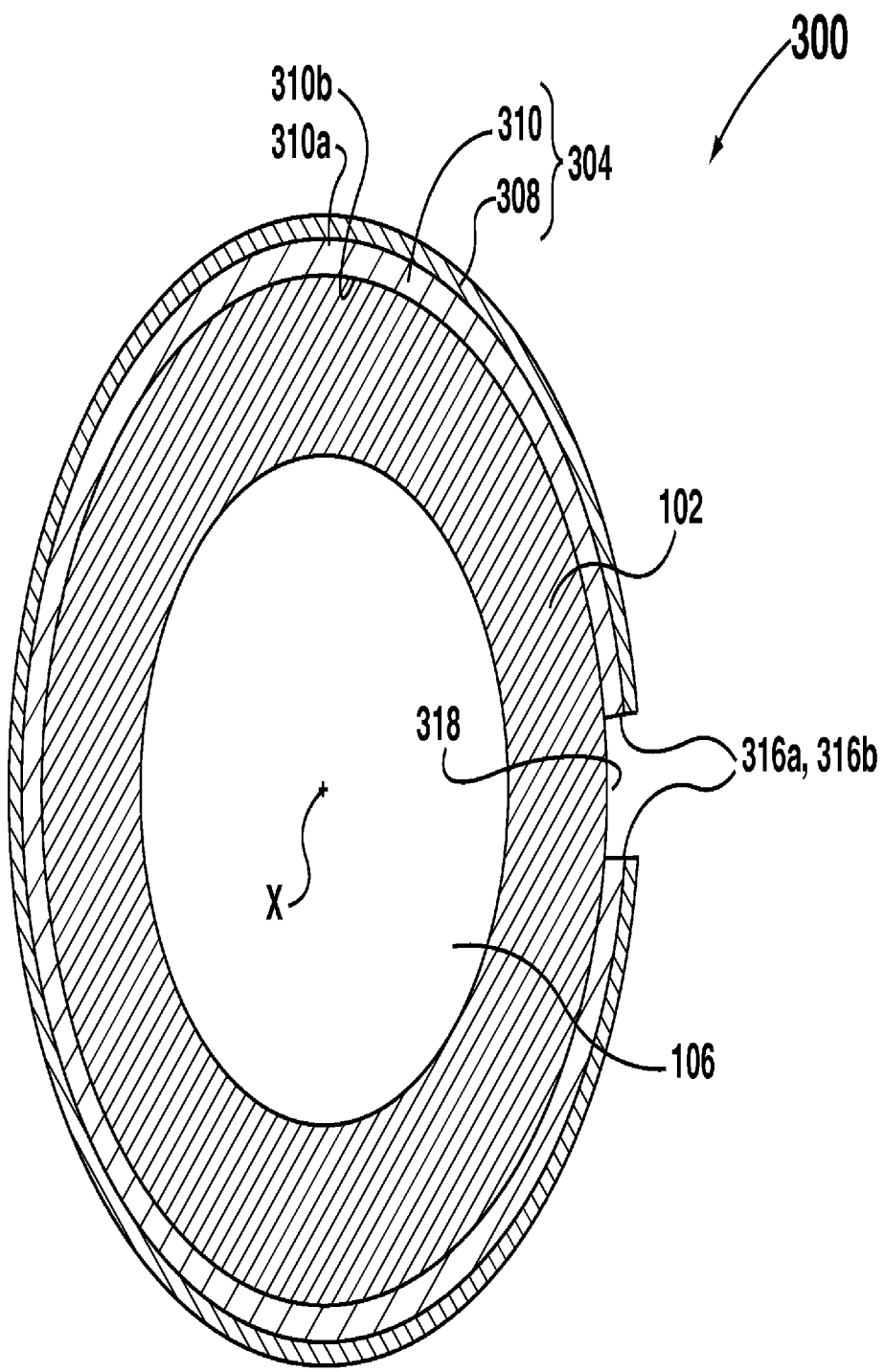
FIG. 3 depicts a cross-sectional view of a melt distribution device in accordance with a third non-limiting embodiment.

FIG. 3 depicts a third non-limiting embodiment of a melt distribution device 300, which is substantially similar to the first non-limiting embodiment depicted in FIG. 1, other than specific differences outlined below.

In the specific non-limiting embodiment depicted in FIG. 3, both the heat-receiving part 102 and the heater 304 are substantially cylindrical in shape. The heater 304 is slotted such that the heater 104 has two ends 316a, 316b that define a gap 318 therebetween. The gap 318 runs along the heater 104. A portion of the proximal surface 310a of the sleeve 310 may be welded to the outer surface the heat-receiving part 102 in one location. The one location may be a line that extends along the outer surface of the heat-receiving part 102 and is substantially parallel to a longitudinal axis X thereof. The one location may be adjacent to only one of the two ends 116a, 116b. Other than at the one location, where there is a fixed constraint between heat-receiving part 102 and the heater 304, there is an interference fit between the sleeve 310 and the heat-receiving part 102.

In operation, by not having a fixed constraint present between at least one end of the two ends 316a, 316b and the heat-receiving part 102, the detrimental effect from the transmission of stress and strain from injection pressure and/or thermal expansion of the heat-receiving part 102 to the heater 304 is at least partially reduced.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A melt distribution device (100, 200, 300), comprising:
   a heat-receiving part (102, 202) defining a melt flow channel adapted to receive melt flow therethrough, the heat-receiving part having an outer surface; and
   a heater (104, 304);
   the heater (104, 304) being coupled to the outer surface of the heat-receiving part (102, 202) so to (i) maintain thermal communication between the heater (104, 304) and the heat-receiving part (102, 202); and (ii) define a gap therebetween to isolate, at least partially, the heater (104, 304) from receiving stress and strain transmission from the heat-receiving part (102, 202).

2. The melt distribution device (100, 200, 300) according to claim 1, wherein:
   the heater (104, 304) is affixed to the heat-receiving part (102, 202).

3. The melt distribute on device (100, 200, 300) according to claim 1, wherein the heat-receiving part (102, 202) is:
   a nozzle, a manifold, or combinations thereof.

4. The melt distribution device (100, 200, 300) according to claim 1, wherein:
   the heater (104, 304) and the heat-receiving part (102, 202) are substantially cylindrical, and
   the heater (104, 304) is disposed around the heat-receiving part (102, 202).

5. The melt distribution device (100, 200, 300) according to claim 4, wherein the heater (104, 304) includes:
   a film heater (108, 308); and
   a sleeve (110, 310); the film heater (108, 308) being disposed on the sleeve (110, 310).

6. The melt distribution device (100, 200, 300) according to claim 5, wherein:
   the film heater (108, 308) has ceramic dielectric layers and resistive trace.

7. The melt distribution device (100, 200, 300) according to claim 5, wherein the film heater (108, 308) is:
   a thermally sprayed heater, a thin film heater, a thick film heater, or any combinations thereof.

8. The melt distribution device (100, 200, 300) according to claim 5, wherein the sleeve (110, 310) has:
   a distal surface (110*b*, 310*b*) and a proximal surface (110*a*, 310*a*), relative to the heat-receiving part (102), the film heater (108) being deposited in a layer on the distal surface (110*b*, 310*b*) of the sleeve (110, 310).

9. The melt distribution device (100) according to claim 8, wherein:
   a portion of the proximal surface of the sleeve (110) is welded in one location (120) to an outer surface the heat-receiving part (102), the one location (120) being a line that extends along the outer surface of the heat-receiving part (102) and is substantially parallel to a longitudinal axis (X), such that the gap (112) is defined by the proximal surface (110*a*) of the sleeve (110) and the outer surface of the heat-receiving part (102), and the gap (112) is responsible, at least in part, for isolating the heater (104) from stress and strain transmission received from the heat-receiving part (102).

10. The melt distribution device (100) according to any one of claim 1 or claim 9, wherein:
    the gap (112) is filled with air.

11. The melt distribution device (200) according to claim 8, wherein:
    a portion of the proximal surface (110*a*) of the sleeve (110) is welded in at least a first location (220*a*) and a second location (220*b*) to an outer surface the heat-receiving part (202), the first location (220*a*) and the second location (220*b*) each extending at least partially around a circumference thereof, such that the gap (212) is defined by the proximal surface (110*a*) of the sleeve (110) and the outer surface of the heat-receiving part (202), and the gap (212) is responsible, at least in part, for isolating the heater (104) from stress and strain transmission received from the heat-receiving part (102).

12. The melt distribution device (200) according to claim 11, wherein:
    the gap (212) is filed with air.

13. The melt distribution device (100) according to claim 11, wherein the melt distribution device (100) further comprises:
    a nozzle tip (214);
    the first location (220*a*) being disposed proximal to the nozzle tip (214) and the second location (220*b*) being disposed distal to the nozzle tip (214).

14. A melt distribution device, comprising:
    a heat-receiving part; and
    a heater comprising a film heater and a sleeve, the film heater being disposed on the sleeve;
    the heater and the heat-receiving part are substantially cylindrical, the heater is disposed around the heat-receiving part, the heater being coupled to the heat-receiving part so to (i) maintain thermal communication between the heater and the heat-receiving part; and (ii) isolate, at least partially, the heater from receiving stress and strain transmission from the heat-receiving part,
    wherein the sleeve has a distal surface and a proximal surface, relative to the heat-receiving part, the film heater being deposited in a layer on the distal surface of the sleeve, and,
    wherein the heater further includes:
       two ends, the two ends defining a gap therebetween, the gap running along the heater, whereby the gap is responsible, at least in part, for isolating the heater from stress and strain transmission received from the heat-receiving part.

\* \* \* \* \*